UNITED STATES PATENT OFFICE.

ALVAH W. HOLWAY, OF BOSTON, MASSACHUSETTS.

MANUFACTURE OF MEDICATED LOZENGES OR TABLETS.

SPECIFICATION forming part of Letters Patent No. 297,800, dated April 29, 1884.

Application filed February 9, 1884. (No specimens.)

*To all whom it may concern:*

Be it known that I, ALVAH W. HOLWAY, a citizen of the United States, and a resident of Boston, in the county of Suffolk and State of Massachusetts, have invented certain new and useful Improvements in the Manufacture of Medicated Lozenges, of which the following is a specification.

The invention has relation to an improvement in the manufacture of medicated lozenges or tablets. Its distinctive novelty consists in the utilization of a tablet or lozenge of sugar as a vehicle to contain or carry the article known as "acid phosphate," a description of which is contained in Letters Patent of the United States No. 75,272, dated March 10, 1868.

In practice I take, say, one hundred pounds of sugar, with which I mix about a tea-spoonful of cream of tartar and, say, two gallons of water, and boil the whole until it reaches about 310° Fahrenheit, or a higher degree if possible without burning. Just before taking the mixture off I add a flavoring or color of any kind, if desired, after which the compound, while hot, is poured upon marble slabs, and before cooling I add the acid phosphate in the form of a paste, in the proportions of about ten pounds of the acid phosphate to one hundred pounds of the compound, as described above, and knead the compound until the acid phosphate is thoroughly dissolved, and then treat it in the ordinary manner to form it into tablets or lozenges. Great care will be taken to add not more than about a tea-spoonful of cream of tartar to, say, a hundred pounds of sugar, as an excessive amount will materially prejudice the result.

In packing the goods it is desirable that the air be excluded as much as possible to prevent a possible tendency of the ingredients to evaporate.

While I recommend the use of the proportions which I have specified, I do not limit my claim to them, as they may be varied according to circumstances, and it is plain that other ingredients than I have mentioned may be added without changing the nature of the tablet.

What I claim as my invention, and desire to secure by Letters Patent, is—

1. A tablet or lozenge consisting of sugar, cream of tartar, and acid phosphate, substantially as set forth.

2. The process herein described of forming a tablet or lozenge of sugar and acid phosphate, which consists in boiling the sugar and incorporating the acid phosphate by kneading while the compound is very hot, substantially as set forth.

3. A tablet or lozenge in which sugar and acid phosphate constitute a base, substantially as expressed.

Signed at New York, in the county of New York and State of New York, this 8th day of February, A. D. 1884.

ALVAH W. HOLWAY.

Witnesses:
CHAS. C. GILL,
HERMAN GUSTOW.